United States Patent [19]

Fukunaga et al.

[11] Patent Number: 4,632,233

[45] Date of Patent: Dec. 30, 1986

[54] TORQUE CONVERTER EQUIPPED WITH LOCKUP CONTROL UNIT

[75] Inventors: Takao Fukunaga, Hirakata; Akira Inoue, Suita, both of Japan

[73] Assignee: Kabushiki Kaisha Daikin Seisakusho, Neyagawa, Japan

[21] Appl. No.: 618,789

[22] Filed: Jun. 8, 1984

[30] Foreign Application Priority Data

Jun. 13, 1983 [JP] Japan .................. 58-90802[U]

[51] Int. Cl.$^4$ .................... F16D 33/02; F16D 43/284
[52] U.S. Cl. .................................. 192/3.3; 192/3.31; 192/103 FA; 192/105 F
[58] Field of Search ............. 192/3.29, 3.31, 3.33, 192/3.3, 85 F, 105 F, 103 FA

[56] References Cited

U.S. PATENT DOCUMENTS

| | | | |
|---|---|---|---|
| 2,894,609 | 7/1959 | Tattersall | 192/3.31 X |
| 2,964,959 | 12/1960 | Beck et al. | 192/3.3 X |
| 3,542,174 | 11/1970 | Hattori | 192/3.31 X |
| 3,693,478 | 9/1972 | Malloy | 192/3.3 X |

FOREIGN PATENT DOCUMENTS

| | | | |
|---|---|---|---|
| 0011908 | 6/1980 | European Pat. Off. | 192/103 FA |
| 2120619 | 11/1972 | Fed. Rep. of Germany | 192/3.3 |
| 2643558 | 3/1978 | Fed. Rep. of Germany | 192/3.3 |
| 1352465 | 5/1974 | United Kingdom | 192/3.3 |

Primary Examiner—Rodney H. Bonck
Assistant Examiner—Alan G. Towner

[57] ABSTRACT

A torque converter equipped with a lockup control unit providing a hydraulic clutch in the torque converter, utilizing a hydraulic power supply for the hydraulic clutch as a feed pump for circulating oil in the torque converter, and providing a control valve between the torque converter and the feed pump, the control valve quickly increasing a pressure of said circulating oil to make the hydraulic clutch engage when an engine rotational speed or a vehicle speed exceeds a prescribed value.

2 Claims, 4 Drawing Figures

TORQUE CONVERTER EQUIPPED WITH LOCKUP CONTROL UNIT

FIELD OF THE INVENTION

This invention relates to a torque converter equipped with a control unit which controls a lockup mechanism.

DESCRIPTION OF THE PRIOR ART

A conventional lockup mechanism (clutch mechanism) equipped in a torque converter is constructed so that signals of certain variables, such as vehicle speed, engine rotational speed etc. are detected by a sensor a special-purpose input valve is controlled by these signals, and resultant change in hydraulic pressure actuates the mechanism itself.

However, the above-mentioned conventional construction has a disadvantage of being complicated and expensive due to indispensability of a sensor a computing circuit, a valve, a hydraulic passage etc. having special purpose for actuating the lockup mechanism.

In consideration of the above disadvantage, an object of this invention is to automatically actuate the lockup mechanism by exerting ingenuity in a conventionally-used control valve for regulating supply of hydraulic pressure to a torque converter, to simplify the construction by making unnecessary the special-purpose sensor valve etc. which have conventionally been required, and to minimize a manufacturing cost thereof.

In order to accomplish the above object, in this invention, a hydraulic clutch is equipped in a torque converter, a hydraulic power supply for the hydraulic clutch is utilized as a feed pump for circulating oil in the torque converter, and a control valve is provided between the torque converter and the feed pump, which quickly increases a pressure of said circulating oil to make the hydraulic clutch engage when an engine rotational speed or a vehicle speed exceeds a prescribed value.

DETAILED DESCRIPTION OF THE INVENTION

Figure 1:
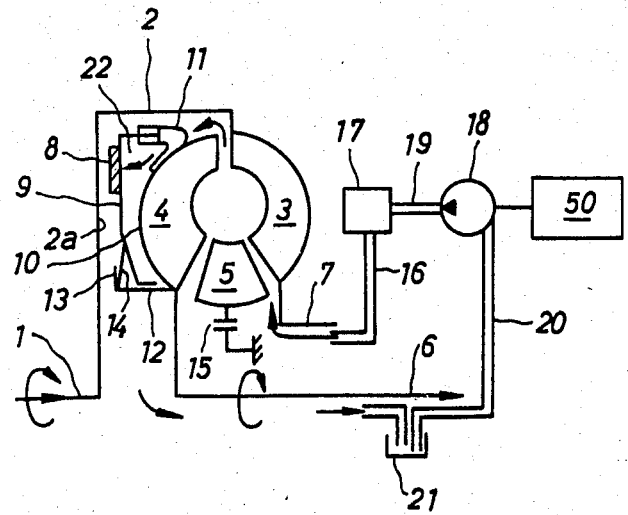
FIG. 1 is a vertical sectional partial schematic diagram of a converter according to this invention.

In FIG. 1, a housing 2 is connected to an input shaft 1 which is interconnected to a crank shaft of an engine 50 to input of torque, the housing 2 is fixed to an outer peripheral end of a pump impeller 3, and the housing 2 together with the impeller 3 cover other wheels 4, 5. The pump impeller 3 has its inner peripheral side a guide pipe 7 concentric with an output shaft. The turbine wheel 4 opposing the impeller 3 is integrally interconnected to the output shaft 6, and a stator wheel 5 having a one-way clutch 15 at its inner peripheral side is arranged in between the impeller 3 and the wheel 4. Further, an approximately disc-shaped pressure plate 9 having a facing 8 at a friction surface 2a side of the housing is concentrically arranged in between the housing 2 and the turbine wheel 4, and the plate 9 is supported by the turbine wheel 4 freely slidingly in the axial direction. Moreover, an outer peripheral portion of the plate 9 engages with an engaging member fixed to a turbine shell 10 of the turbine wheel 4 freely slidingly only in the axial direction. A flange-shaped stopper 13 is formed on a cylindrical part 12 fixed to the wheel 4 and engaging with the plate 9 at the end of the friction surface 2a side thereof, and a belleville spring 14 is compressively provided between the stopper 13 and the plate 9.

One end of an oil passage 16 is interconnected to a cylindrical clearance formed between the guide pipe 7 and the output shaft 6, and the other end of the oil passage 16 is interconnected to a control valve 17. An oil inlet of the control valve 17 (described in details later) is connected through an oil passage 19 to an oil outlet of a gear pump driven by said engine 50, and an oil inlet of the gear pump 18 is so designed as to pump oil up from an oil pan 21 through an oil passage 20. Incidentally, the gear pump 18 engages, for example, with the guide pipe 7 to be driven by rotation of the pipe 7. Oil induced from the oil passage 16 is so circulated that it passes through insides of impeller and wheel 3, 4, 5 as shown by arrows to be induced into an oil pressure chamber 22 formed between the pressure plate 9 and the turbine shell 10, and further it is discharged to the oil pan 21 through an oil passage (not shown) formed inside the output shaft 6.

Figure 2:
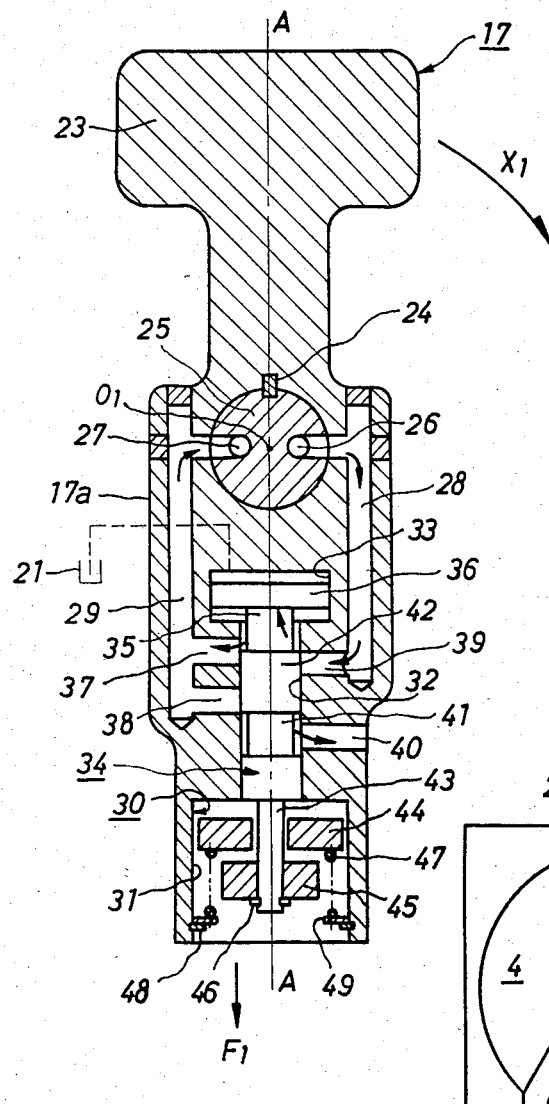
FIG. 2 is a vertical sectional side view thereof.

An example of the control valve 17 will be described in details hereunder. In FIG. 2, the control valve 17 consists of a valve body 17a and a counterbalance 23, and a center axis 25 integrally fitting through a key 24 into a central portion of the valve 17 is interconnected to an output of the engine 50 (FIG. 1). Two oil passages 26, 27 (flowing-in and flowing-out oil passages) parallel to an axis center $O_1$ are formed in the center axis 25, the oil passages 26, 27 being interconnected to a flowing-in oil passage 28 and a flowing-out oil passage 29 drilled in the valve body 17a respectively. Incidentally, the control valve 17 is so deviced as to rotate, for example, in the direction of arrow $X_1$ with a rotation of the center axis 25 to cause a centrifugal force to be produced in the valve body 17a in the direction of arrow $F_1$.

On the other hand, a hole 30 having its center axis on a central line A—A is formed in the direction from the valve body 17a tip side toward the axis center $O_1$ side. The hole 30 includes, generally from the tip side, a large-dia. portion 31, a small-dia. portion 32 and a medium-dia. portion 33. A spool-shaped governor valve 34 fits in the small-dia. portion 32 freely slidingly. A center-side small-dia. portion 35 is formed on the center $O_1$ side end of the valve 34 with an annular clearance from the small-dia. portion 32 therebetween, and a piston portion 36 freely slidingly fitting in the medium-dia. portion 33 along the central line A—A is provided at the center $O_1$ side end. A passage shown by a broken line is formed at the center $O_1$ side bottom surface of the medium-dia. portion 33 to be interconnected to outside. The body tip side end portion of the flowing-out oil passage 29 opens to the small-dia. portion 32 through two oil passage 37, 38 perpendicular to the central line A—A respectively. The body tip side end portion of the flowing-in oil passage 28 opens to the small-dia. portion 32 provided between the oil passages 37 and 38 on the basis of the direction of the central line A—A. An oil passage 40 (drain port) perpendicular to the central line A—A is drilled at the body tip side of the oil passage 38 and interconnects a clearance formed by a body tip side small-dia. portion 41 formed on the valve 34 to outside. Incidentally, a length of a large-dia. portion 42 of the governor valve 34 sandwiched between the small-dia. portions 35 and 41 along the central line A—A coincides with that between a body tip side end face of the oil passage 38 and a center $O_1$ side end face of the oil passage 39 along the central line A—A.

A support shaft portion 43 projecting into the large-dia. portion 31 is formed on the body tip side end of the governor valve 34, and a disc-shaped large weight 44 and a small weight 45 freely slidingly fit onto the support shaft portion 43 from the body tip side. A snap ring 46 fits onto the tip of the support shaft portion 43, and the small weight 45 contacts against the ring 46 to be stopped thereat. A coil spring 47 having a diameter larger than that of the weight 45 is disposed at an outside of a periphery of the small-dia. weight 45. The the spring 47 is compressively held between an annular washer 49 supported at the tip end of the large-dia. portion 31 by the snap ring 48 and the large weight 44.

The function of the converter will be described hereunder. When the engine 50 starts to rotate the input shaft in FIG. 1 and the pump impeller 3 rotates through the housing 2, a torque is transmitted to the turbine wheel to rotate it through oil filled in the torque converter and is delivered to the output shaft 6. Further, the rotation of the engine 50 will also actuate the gear pump 18 to supply circulation oil into the converter through the control valve 17. The supplied oil is circulated through each impeller and wheel 3, 4, 5 to be returned to the oil pan 21, and exerts hydraulic pressure in the oil pressure chamber 22 as shown by the arrow in this instance. Here, the control valve 17 functions, as described later, to supply low-pressure circulation oil when a speed of the engine 50 is below a prescribed value, and to supply high-pressure circulation oil when it is above the prescribed value. Consequently, when the speed of the engine 50 is below the prescribed value, the hydraulic pressure exerted on the oil pressure chamber 22 is low, so that the pressure plate 9 is disposed to the side of the turbine wheel 4 due to resiliency of the belleville spring 14 and the facing 8 is kept apart from the friction surface 2a. Namely, in this case, a torque fed to the input shaft 1 is transmitted from the pump impeller 3 through oil to the turbine wheel 4, thus ordinary torque conversion function being performed.

On the other hand, when the speed of the engine 50 exceeds the prescribed value, oil pressure supplied from the control valve 17 rises abruptly, and the pressure in the oil pressure chamber 22 becomes high to overcome that of the belleville spring 14 to make the pressure plate 9 slide toward the side of the friction surface 2a. As the result, the facing 8 presses against the friction surface 2a and the housing 2 is interconnected integrally through the pressure plate 9 to the turbine wheel 4, thus the input shaft 1 being brought to direct coupling condition with the output shaft 6.

Figure 3:
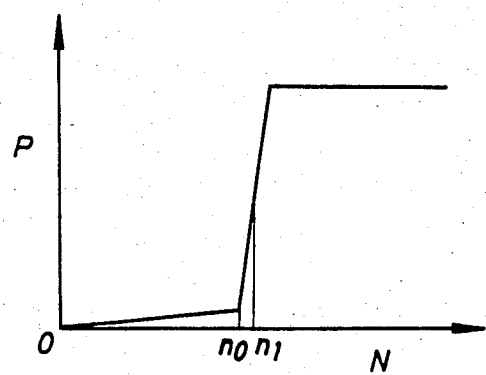
FIG. 3 is a graph showing a relation between rotational speed and hydraulic pressure.

In this instance, the control valve 17 will function as follows: FIG. 3 is a graph showing the relation between a rotational speed N and a supplied oil pressure P of the control valve 17 (FIG. 2). For a rotational speed N below the prescribed value $n_0$, i.e. in a low speed region, a rise of oil pressure P is small. Within a range of rotational speed N from 0 to $n_0$, a centrifugal force exerted on the large weight 44 of the control valve 17 (FIG. 2) in the direction of arrow $F_1$ can not overcome a force of the spring 47 so that the weight 44 will not contact with the small weight 45. Therefore, a load applied to the governor valve 34 is no more than that produced by the small weight 45 and only a low oil pressure is required to be applied on the piston portion 36 in the direction opposite to the arrow $F_1$ in order to balance that load, so that an oil pressure in the flowing-out oil passage 29 is low. In this case, the oil pressure P rises by an amount corresponding to an increase in a centrifugal force applied on the small weight 45 with an increase in the rotational speed N. Consequently, the oil pressure P is kept low as shown by the graph between 0 and $n_0$ in FIG. 3.

Stiffness of the spring 47 is so set that the large weight 44 contacts with the small weight 45 when the rotational speed N reaches $n_o$, and centrifugal forces applied on both the weights 44, 45 exert a load on the governor valve 34 in the direction of $F_1$ when the rotational speed N exceeds $n_o$. Namely, since a load applied on the valve 34 abruptly rises at the spot of $n_o$ and an oil pressure applied on the piston portion 36 in the direction opposite to the arrow $F_1$ in order to balance that load rises abruptly, an oil pressure in the flowing-out oil passage 29 rises quickly. As the result, the oil pressure in the oil pressure chamber 22 of FIG. 1 rises quickly to overcome the force of the belleville spring 14, thus making the pressure plate 9 slide to bring the torque converter into the direct coupling condition. A rotational speed N at this moment will become, for instance, to $n_1$. When the rotational speed N increases further, the oil pressure P will increase by an amount corresponding to an increase in a centrifugal force applied on both the weight 44, 45. However, the oil pressure P does not rise above a predetermined value due to performance of the gear pump 18 (FIG. 1) and will stay constant thereafter.

Incidentally, it is possible to change the predetermined rotational speeds $n_o$, $n$, and the rising characteristics (inclination) of oil pressure P at will by variously changing the weights of the weights 44, 45 and the stiffness of the coil spring 47. Further, the rotational speed $n_1$ may be changed by changing characteristics of the belleville spring 14 (FIG. 1).

As described above, according to the present invention, the hydraulic clutch (the pressure plate etc.) is equipped in the torque converter, the hydraulic power supply for the hydraulic clutch is utilized as the feed pump (for instance, the gear pump 18) for circulating oil in torque converter, and the control valve 17 is provided between the torque converter and the feed pump, which quickly increases the pressure of said circulating oil to make the hydraulic clutch engage when the engine rotational speed or the vehicle speed exceeds the prescribed value. Consequently, advantages are obtainable that it is possible to make the control valve 17 for regulating the supply hydraulic pressure to the torque converter actuate the lockup mechanism (clutch for direct coupling) automatically, and the composition is simplified by making unnecessary the special-purpose sensor, valve etc. which have conventionally been required. Further, the simplified construction will result in a reduction of a manufacturing cost thereof.

Moreover, the following composition may be employed in embodying the present invention.

(a) It is also possible to make the control valve 17 function in correspondence with the vehicle speed. In this case, the control valve 17 may be attached, for example, to a shaft which connects a transmission to an axle.

(b) The plate 9 may be connected to the turbine shell 10 by using a leaf-spring-shaped strap plate in place of the belleville spring 14, so that the plate 9 can be urged toward the side of the turbine wheel 4 by means of this strap plate.

Figure 4:
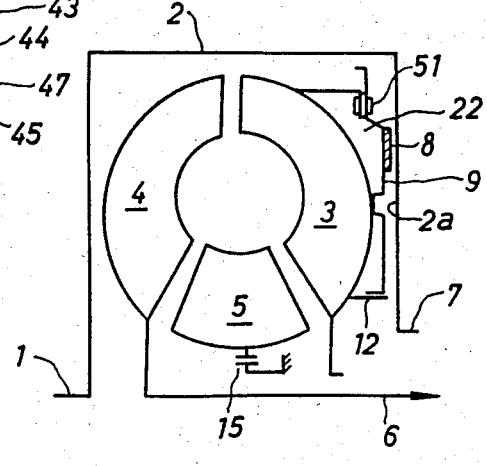
FIG. 4 is a vertical sectional partial schematic diagram of another embodiment.

(c) The housing 2 may be separated from the pump impeller 3 to dispose the pressure plate 9 therebetween as shown in FIG. 4. Here, the function of the control valve 17 is so set that the oil pressure is kept low during idling of the engine 50 (FIG. 1) and is raised abruptly when its rotation exceeds that speed. In this instance, the creep of vehicle can be avoided and fuel consumption can be improved. Incidentally, 51 of FIG. 4 is the strap plate.

What is claimed is:

1. A torque converter equipped with a lockup control unit for controlling engaging and disengaging of a hydraulic clutch in the torque converter utilizing a feed pump for circulating oil in the torque converter as a hydraulic power supply for the hydraulic clutch, said lockup control unit including control valve means disposed in a hydraulic supply path between the torque converter and the feed pump and rotationally coupled to an output shaft of an engine associated with the torque converter for quickly increasing pressure of the circulating oil to engage the hydraulic clutch when engine rotational speed exceeds a prescribed value by opening and closing depending on a change in centrifugal force exerted on said control valve means, said control valve means comprising a control valve body, a governor valve slideably mounted in said control valve body having a small weight on one end thereof acted upon by centrifugal force and a piston portion on the other end thereof acted upon by hydraulic pressure from the feed pump, said piston portion balancing said small weight during rotation, and said governor valve being adapted to send a prescribed pressure to the torque converter when the engine rotational speed is below said prescribed value, and a large weight slideably mounted in said control valve body associated with said one end of said governor valve and overlapping said small weight so as to move radially outwardly with said small weight to further open said control valve means when the engine rotational speed exceeds said prescribed value.

2. A torque converter as claimed in claim 1, wherein said control valve means further comprises a spring mounted on said control valve body biasing said large weight radially away from said small weight until the engine rotational speed exceeds said prescribed value.

* * * * *